(12) United States Patent
Breau et al.

(10) Patent No.: US 8,578,005 B1
(45) Date of Patent: Nov. 5, 2013

(54) SYSTEMS AND METHODS FOR PROVIDING UPDATE NOTIFICATIONS TO MOBILE DEVICES USING MOBILE-IP EXTENSIONS

(75) Inventors: Jeremy R. Breau, Leawood, KS (US); Arun Santharam, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1346 days.

(21) Appl. No.: 12/190,940

(22) Filed: Aug. 13, 2008

(51) Int. Cl.
*G06F 15/177* (2006.01)

(52) U.S. Cl.
USPC ............ 709/221; 709/222; 709/202; 709/224

(58) Field of Classification Search
USPC .................................. 709/221, 222, 202, 224
See application file for complete search history.

(56) References Cited

U.S. PATENT DOCUMENTS

| | | | |
|---|---|---|---|
| 5,852,812 A | 12/1998 | Reeder | |
| 6,055,236 A | 4/2000 | Nessett et al. | |
| 6,189,042 B1 | 2/2001 | Keller-Tuberg | |
| 6,421,714 B1 | 7/2002 | Rai et al. | |
| 6,697,354 B1 | 2/2004 | Borella et al. | |
| 6,778,528 B1 * | 8/2004 | Blair et al. | 370/352 |
| 6,785,256 B2 | 8/2004 | O'Neill | |
| 6,816,912 B1 | 11/2004 | Borella et al. | |
| 6,829,473 B2 | 12/2004 | Raman et al. | |
| 6,956,846 B2 | 10/2005 | Lewis et al. | |
| 6,965,914 B2 | 11/2005 | Dowling | |
| 6,973,309 B1 | 12/2005 | Rygula et al. | |
| 6,993,039 B2 | 1/2006 | Borella | |
| 7,028,335 B1 | 4/2006 | Borella et al. | |
| 7,031,275 B1 | 4/2006 | Borella et al. | |
| 7,032,242 B1 | 4/2006 | Grabelsky et al. | |
| 7,080,151 B1 | 7/2006 | Borella et al. | |
| 7,082,130 B2 | 7/2006 | Borella et al. | |
| 7,099,650 B2 | 8/2006 | Akgun et al. | |
| 7,130,625 B2 | 10/2006 | Akgun et al. | |
| 7,146,152 B2 | 12/2006 | Akgun et al. | |
| 7,154,868 B1 | 12/2006 | Sharma et al. | |
| 7,218,609 B2 | 5/2007 | Borella et al. | |
| 7,272,128 B2 | 9/2007 | Harris et al. | |
| 7,280,546 B1 | 10/2007 | Sharma et al. | |
| 7,286,512 B1 | 10/2007 | Borella | |
| 7,295,511 B2 | 11/2007 | Sharma et al. | |
| 7,305,429 B2 | 12/2007 | Borella | |
| 7,324,499 B1 | 1/2008 | Borella et al. | |
| 7,330,453 B1 | 2/2008 | Borella et al. | |
| 7,346,684 B2 | 3/2008 | Borella | |
| 7,366,509 B2 | 4/2008 | Akgun et al. | |
| 7,426,188 B2 | 9/2008 | Borella | |
| 7,454,206 B1 | 11/2008 | Phillips et al. | |
| 2002/0191572 A1 | 12/2002 | Weinstein et al. | |

(Continued)

OTHER PUBLICATIONS

MSDN, "OMA DM version 1.1.2 Architecture," May 22, 2008.

(Continued)

*Primary Examiner* — Lan-Dai T Truong

(57) ABSTRACT

The present invention provides systems and methods for notifying mobile devices of the presence of software and/or firmware updates using Mobile-IP extensions. When a mobile device seeks to engage in a Mobile-IP session, it sends a Mobile-IP registration request message. When it receives a reply to the registration request, the reply includes a Mobile-IP extension that indicates whether an update is available for the mobile device. If the extension indicates that an update is available, the mobile device responsively obtains the update.

18 Claims, 4 Drawing Sheets

(56) References Cited

U.S. PATENT DOCUMENTS

| | | | |
|---|---|---|---|
| 2003/0046396 A1 | 3/2003 | Richter et al. | |
| 2003/0236745 A1 | 12/2003 | Hartsell et al. | |
| 2004/0103171 A1 | 5/2004 | Mullis, II et al. | |
| 2005/0186952 A1* | 8/2005 | Kitajima | 455/419 |
| 2006/0077924 A1 | 4/2006 | Rune | |
| 2007/0037553 A1* | 2/2007 | Patel et al. | 455/410 |
| 2007/0263614 A1* | 11/2007 | Sakai | 370/356 |
| 2008/0126555 A1* | 5/2008 | Rao | 709/230 |
| 2008/0291867 A1 | 11/2008 | Weniger et al. | |
| 2008/0304441 A1 | 12/2008 | Tsirtsis et al. | |

OTHER PUBLICATIONS

Microsoft, "OTA Firmware Update Architecture," printed Jun. 16, 2008.

G. Dommety et al., "Mobile IP Vendor/Organization-Specific Extensions," Apr. 2001, Request for Comments 3115.

C. Perkins, "IP Mobility Support for IPv4," Aug. 2002, Request for Comments 3344.

D. Johnson et al., "Mobility Support in IPv6," Jun. 2004, Request for Comments 3775.

Funk Software, Inc., Session Termination and Hotlining Services for CDMA Operators—Using Funk Software's Steel-Belted Radius®/Session Control Server, Dec. 2005.

Radiator® Radius Server, Open System Consultants Pty. Ltd., Installation and Reference Manual for Radiator Version 4.4 (Mar. 11, 2009).

M. Chiba et al., "Dynamic Authorization Extensions to Remote Authentication Dial in User Service (RADIUS)," Network Working Group, RFC 3576 (Jul. 2003).

Leung, K. et al., WiMax Forum/3GPP2 Proxy Mobile IPv4, Independent Submission, pp. 1-41 (Feb. 2010).

IP Mobility Support for IPv4, Network Working Group, C. Perkins, Ed., Nokia Research Center, pp. 1-89, RFC 3344, (Aug. 2000).

* cited by examiner

SYSTEMS AND METHODS FOR PROVIDING UPDATE NOTIFICATIONS TO MOBILE DEVICES USING MOBILE-IP EXTENSIONS

FIELD OF THE INVENTION

The present invention relates to Mobile-IP and, more particularly, to notifying mobile nodes of the presence of software and firmware updates using Mobile-IP extensions.

BACKGROUND

In the rapidly evolving world of mobile devices, communication standards are constantly changing, and new features are constantly developed for devices, even after they have been sold to users. For example, mobile electronics developers may continuously provide software and/or firmware updates to electronic devices that add additional functionality to the device. Updates may also be provided in order to fix existing bugs in the device, or to ensure that the device conforms to the latest standards. In addition, mobile devices may be updated with security enhancements that prevent the devices from being compromised. Any many other examples of possible software and/or firmware updates are possible as well.

Typically, the standard used to notify mobile devices of the presence of software and/or firmware updates is the Open Mobile Alliance-Device Management (OMA-DM) standard. Under the OMA-DM standard, if an update is available for a mobile device, an OMA-DM server notifies the mobile device that an update is available by sending a Short Message Service (SMS) message to the mobile device. Alternatively, the mobile device may periodically check with the OMA-DM server for updates. Upon receipt of the SMS message, the mobile device may obtain the update by initiating an Internet Protocol (IP) session with the OMA-DM server.

Many wireless communication devices communicate using the Mobile-IP protocol. Mobile-IP capable devices remain reachable at the same IP address while moving from one network to another. With Mobile-IP, a mobile device obtains and uses a Mobile-IP address referred to as a home address (HoA). Packets to the mobile device are then routed through a Mobile-IP home agent located on the mobile device's home network, and then forwarded to the mobile device using a care-of address, which may be a temporary IP address used by a mobile node while it is located on a foreign network. A more complete explanation of Mobile-IP may be found in C. Perkins et al., "IP Mobility Support for IPv4," Request for Comments 3344, August 2002, the contents of which are incorporated herein by reference, and D. Johnson et al., "Mobility Support in IPv6," Request for Comments 3775, June 2004, the contents of which are also incorporated herein by reference.

In addition, Mobile-IP uses a general "extension" structure that allows optional information to be appended in Mobile-IP control messages. For example, a mobile device may append its network access identifier (NAI) in a Mobile-IP registration request to assist in the authentication process.

Overview

The present invention provides systems and methods for notifying mobile devices of the presence of software and firmware updates using Mobile-IP extensions, thus eliminating the need to use an SMS infrastructure to provide updates. According to an embodiment of the invention, when a mobile device seeks to engage in a Mobile-IP session, it sends a Mobile-IP registration request to a network access server (NAS). The NAS, upon receipt of the registration request, sends an access-request message to an authentication, authorization, and accounting (AAA) server. Once the AAA server receives the access-request message, it determines (1) whether the mobile device is authorized to engage in a Mobile-IP session, and (2) whether an update (e.g., a software and/or firmware update) is available for the mobile device. The AAA server then sends an access-reply message back to the NAS, indicating whether the mobile device is authorized, and whether an update is available for the mobile device.

When the NAS receives the access-reply message indicating that the mobile device is authorized to engage in a Mobile-IP session, the NAS forwards the registration request received from the mobile device to a home agent, which then sends a registration-reply message to the NAS to relay to the mobile device. Upon receipt of the registration-reply, the NAS (1) appends a Mobile-IP extension to the registration-reply, where the extension indicates whether an update is available for the mobile device, and (2) sends the registration-reply to the mobile node. Upon receipt of the registration-reply, the mobile node analyzes the Mobile-IP extension, and obtains the update when the extension indicates that an update is available.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
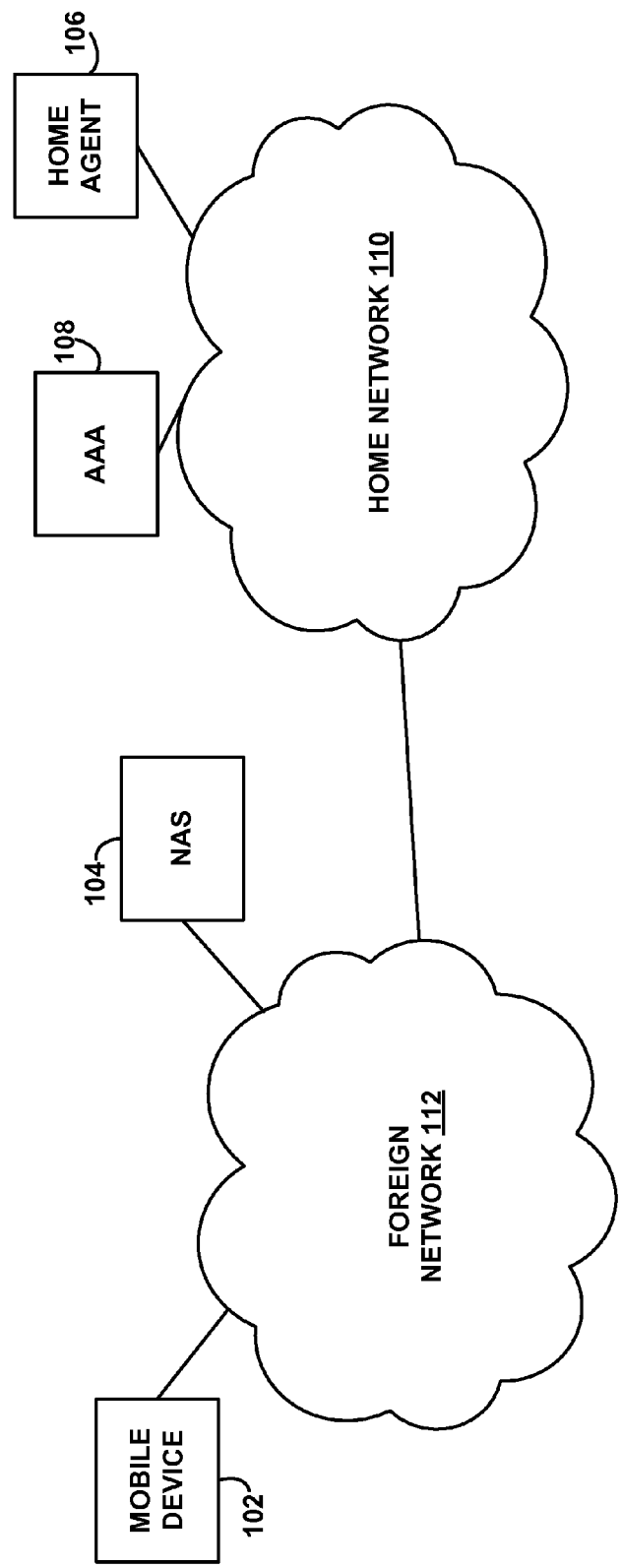
FIG. 1 is a simplified block diagram illustrating a typical Mobile-IP network.

FIG. 1 is a simplified block diagram depicting the functional arrangement and interaction between various network components in accordance with an exemplary embodiment. It should be understood that this network supports Mobile-IP. Further, this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, various functions described herein as being performed by one or more entities may be carried out by hardware, firmware, and/or software.

As shown in FIG. 1, the network includes a home network 110, and a foreign network 112. Located on home network 110 is a home agent 106 and AAA server 108. Located on foreign network 112 is a NAS 104, and a mobile device 102.

It should be understood that any number of other entities could be present as well. For example, any number of mobile devices could be located on home network 110 and/or foreign network 112. Furthermore, any number of intermediate devices and networks could make up all or part of any of the communication links shown in FIG. 1. As examples, there could be additional routers, wireless networks, or other devices, such as IP gateways and/or DHCP servers located on any of the networks.

In general, mobile device 102 is any device capable of using Mobile-IP. Mobile device 102 may be capable of using Mobile-IPv4, Mobile-IPv6 or any other version of Mobile-IP. As examples, mobile device 102 may be a cellular phone, a personal data assistant (PDA), or other type of wirelessly-equipped device now known or later developed.

NAS 104 provides mobile devices such as mobile device 102 access to foreign network 112. Additionally, NAS 104 may act as a Mobile-IPv4 foreign agent for mobile devices communicating using Mobile-IPv4. NAS 104 may receive a mobile IP registration request message from mobile device 102, and then communicate with AAA 108 to (1) determine whether mobile device 102 is authorized to engage in a Mobile-IP session, and (2) receive information regarding whether an update is available for mobile device 102. If mobile device 102 is authorized to engage in a mobile IP session, NAS 104 may relay the registration request to home agent 106. NAS 104 may also receive registration-reply messages from home agent 106. Upon receipt of a registration-reply message from home agent 106, NAS 104 may (1) append to the registration-reply a Mobile-IP extension that indicates whether an update is available for mobile device 102, and (2) send the registration-reply to mobile device 102.

Home agent 106 may be any network device such as a router, server, or workstation that is configured to maintain current location information for mobile node 102 and to relay packets to mobile device 102 in accordance with Mobile-IP, and further to perform other functions typically associated with home agents.

AAA server 108 may be any device capable of determining (1) whether a mobile device is authorized to engage in a Mobile-IP session, and (2) whether an update is available for the mobile device. AAA server 108 may in a single or multiple databases store records of wireless devices authorized to engage in Mobile-IP session, as well as updates available for wireless devices. Alternatively, AAA server 108 may communicate with other entities, such as home agent 106, or an OMA-DM server (not shown) to obtain this information.

Figure 2:
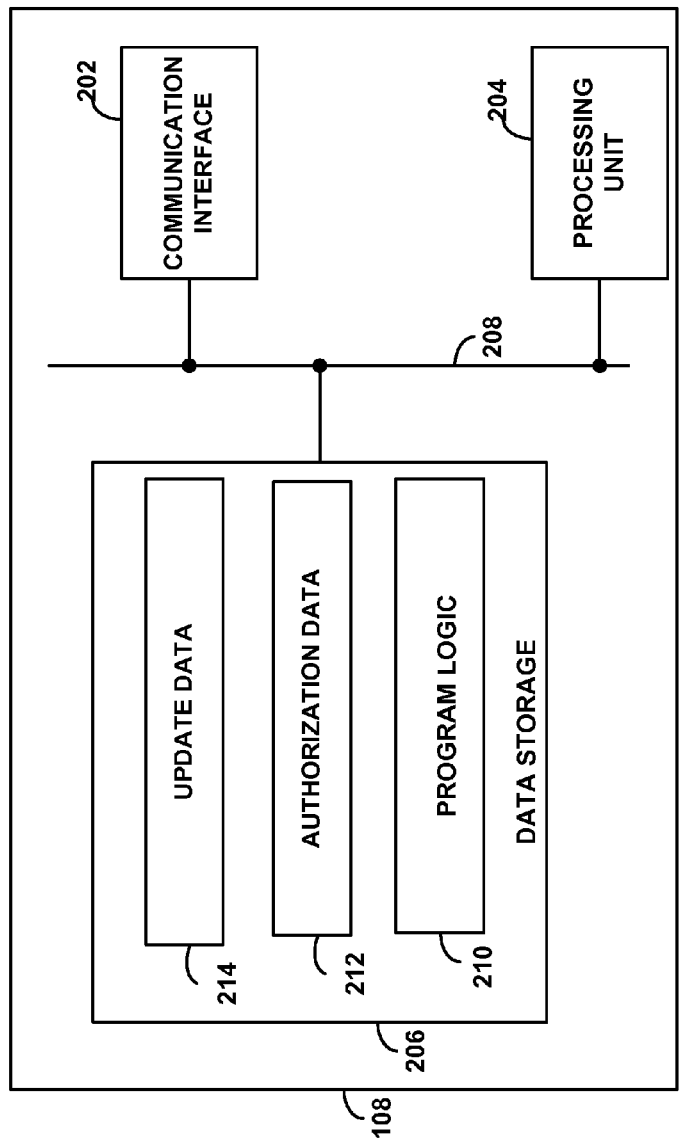
FIG. 2 is a simplified block diagram illustrating a typical AAA server.

FIG. 2 is a simplified block diagram of an exemplary AAA server 108, which may be used in accordance with exemplary embodiments. As shown in FIG. 2, AAA server 108 includes a communication interface 202, a processor 204, and data storage 206, all of which may be communicatively linked by a system bus 208.

Communication interface 202 may include hardware and/or software that AAA server 108 may use to communicate over one or more packet-data networks such as foreign network 112 or home network 110. Communication interface 202 may be configured to engage in wired and/or wireless communication, and thus may include a chipset arranged to communicate according to a protocol such as CDMA, IEEE 802.11, a wired Ethernet interface, and/or one or more other types of communication interfaces. Communication interface 202 may make use of one or more antennas to facilitate wireless communication with one or more devices.

Processor 204 may control many operations of AAA server 108 by executing a set of program logic 210 stored in data storage 206, and may comprise one or more general purpose processors, such as a microprocessor and/or a discrete digital signal processor.

Data storage 206 may store program logic 210, authorization data 212, and update data 214. Data storage 206 may comprise one or more volatile and/or non-volatile storage mechanisms, such as magnetic or optical storage for instance, which may be integrated in whole or in part with processor 204.

Authorization data 212 may include data that identifies mobile devices authorized to engage in Mobile-IP communication sessions. For example, authorization data 212 may include a list of network access identifiers (NAIs) associated with mobile devices authorized to engage in Mobile-IP communications sessions.

Update data 214 may include data indicative of updates that are available for mobile devices. For example, update data 214 may include a list of software and/or firmware updates available for mobile devices. The updates may be associated with specific NAIs, or may be associated in other ways (such as by type of wireless device, or operating system being used by the wireless device). Update data may be received from another entity, such as an OMA-DM server (not shown), or may be received by other entities (or users) as well.

Figure 3:
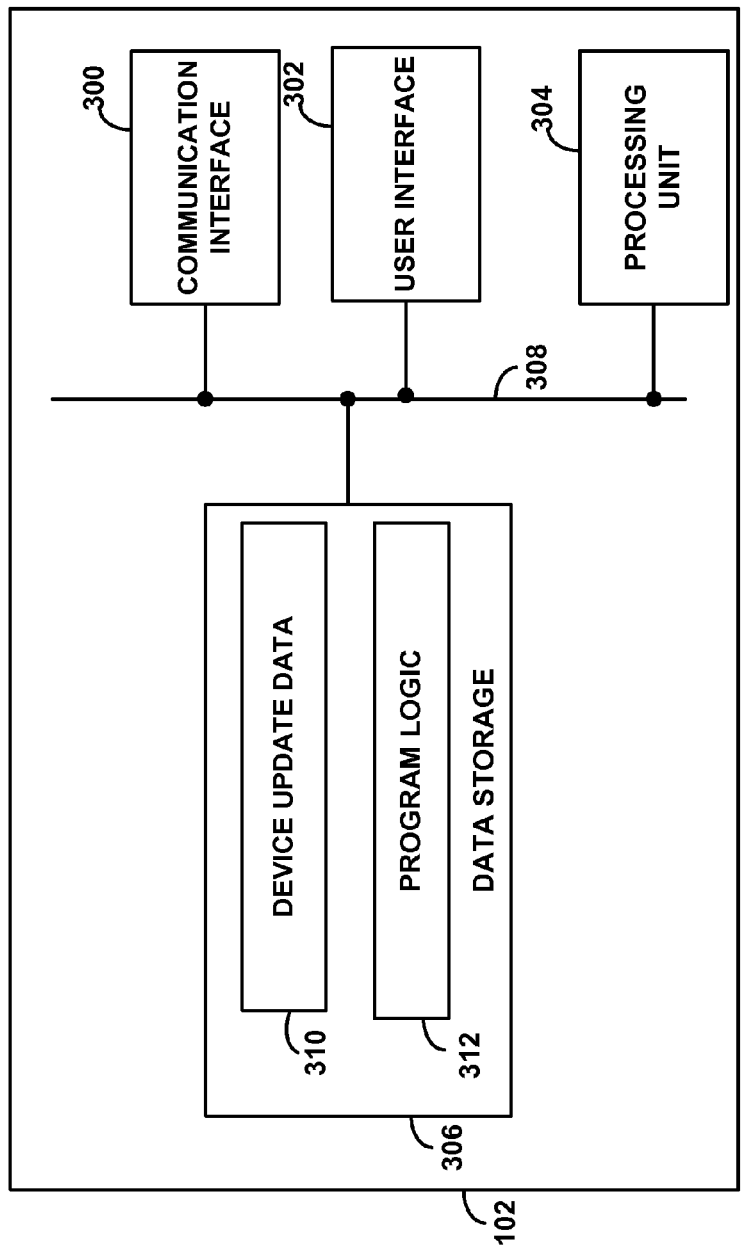
FIG. 3 is a simplified block diagram illustrating a typical mobile device.

Referring next to FIG. 3, a block diagram of an exemplary mobile device is provided, to illustrate functional components of such a device. Mobile device 102 may take the form shown. As illustrated in FIG. 3, the exemplary mobile device includes a communication interface 300, a user interface 302, a processing unit 304, and data storage 306, all of which may be coupled together by a system bus, network, or other mechanism 308.

Communication interface 300 may include hardware and/or software that mobile device 102 may use to communicate over one or more packet-data networks such as foreign network 112 and home network 110. Communication interface 300 may be configured to engage in wired and/or wireless communication, and thus may include a chipset arranged to communicate according to a protocol such as CDMA (e.g., IS-95, IS-2000, 1xRTT, 1xEV-DO, etc.), iDEN, WiMAX, TDMA, AMPS, GSM, GPRS, UMTS, EDGE, LTE, a wired Ethernet interface, and/or one or more other types of communication interfaces, such as IEEE 802.11, or any other communication protocol now known or later developed. Communication interface 300 may make use of one or more antennas to facilitate wireless communication with one or more devices.

User interface 302 comprises input and output components to facilitate user interaction with the device. For voice communication, the user interface 302 preferably includes a microphone and speaker. For visual communication, the user interface 302 may then further include a display screen and perhaps a camera. Additionally, the user interface 302 preferably includes a keypad or other mechanism to facilitate tactile user input.

Processing unit 304 comprises one or more general purpose processors (e.g., INTEL microprocessors) and/or one or more special purpose processors (e.g., digital signal processors). Data storage 306, in turn, comprises one or more volatile and/or non-volatile storage mechanisms, such as memory and/or disc-drive storage for instance, which may be integrated in whole or in part with processing unit 304.

As shown, data storage 306 includes device update data 310 and program logic 312. Program logic 312 may be executable by processing unit 304 to carry out various functions described herein. Device update data 310, in turn, includes information that mobile device 102 uses to obtain updates. For example, device update data 310 may include the IP address of the OMA-DM server (or other entity) from which mobile device 102 obtains updates. Device update data 310 may be pre-set in the mobile device. Alternatively, device data 310 may be updated periodically.

Figure 4:
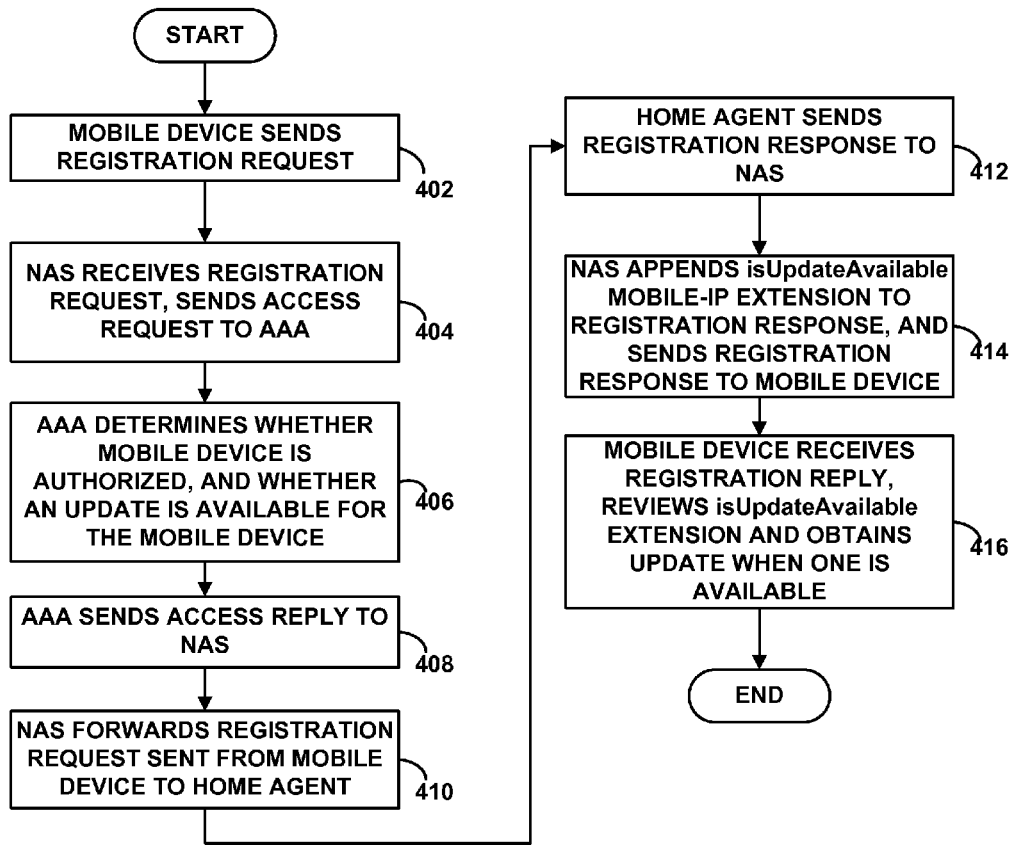
FIG. 4 is a flow chart depicting how a mobile device may be informed of updates using Mobile-IP extensions.

FIG. 4 is a flow chart depicting in summary a set of functions that can be carried out in accordance with an embodiment of the invention. Generally, FIG. 4 depicts a method wherein a mobile device is informed, in a Mobile-IP registration-reply message, whether an update is available.

As shown in FIG. 4, at block 402, mobile device 102 sends a Mobile-IP registration request to NAS 104 in order to engage in a Mobile-IP communication session. If mobile device 102 is using Mobile-IPv4 to communicate, the registration request may be a Mobile-IPv4 registration. If mobile device 102 is using Mobile-IPv6 to communicate, the registration request may be Mobile-IPv6 binding update. Mobile device 102 may use Mobile-IP extensions to append its NAI to the registration request in order to facilitate authentication.

At block 404, NAS 104 receives the registration request from mobile device 102, and responsively sends an access-request message to AAA 108. NAS 104 and AAA server 108 may communicate using AAA protocols such as remote authentication dial in user service (RADIUS) or DIAMETER. NAS 104 may include the NAI associated with mobile node 102 in the access-request message.

Next, at block 406, AAA server 108 receives the access-request message from NAS 104, and determines (1) whether mobile node 102 is authorized to engage in a Mobile-IP session, and (2) whether there are any updates available for mobile device 102. Mobile device 102 may be authorized to engage in a Mobile-IP session, for example, when the NAI included in the access-request message is also stored in authorization data 212. AAA server 108 may determine whether an update is available for mobile device 102 by querying update data 214 to determine whether an update is available. If an update is available, upon receiving the access-request message, AAA server 108 may obtain the update from an entity, such as an OMA-DM server.

At block 408, AAA server 108 sends an access reply message to NAS 104. The access reply message may indicate (1) whether mobile node 102 is authorized to engage in a Mobile-IP session, and (2) whether there are any updates available for mobile device 102.

If mobile device 102 is authorized to engage in a Mobile-IP session, at block 410, NAS 104 forwards the registration-reply sent by mobile device 102 at block 402 to home agent 106. At block 412, home agent 106 sends a registration-reply message to NAS 104. The registration-reply message indicates, among other things, whether the registration request was successful.

At block 414, NAS 104 appends an "is UpdateAvailable" Mobile-IP extension to the registration-reply received from home agent 106, and sends the registration-reply to mobile device 102. The is UpdateAvailable extension indicates whether an update is available. The is UpdateAvailable extension may use any type of Mobile-IP extension format. In this example, the standard Mobile-IP extension format is used. The standard Mobile-IP extension format includes three fields, a type field, a length field, and a data field.

The type field is a number that indicates the particular type of extension being used. In this case, the value would indicate that the extension is the is UpdateAvailable extension. It should be understood that type-field numbers are typically assigned by a standards setting organization. However, any number may be used so long as the mobile device is designed to associate that specific type-field number with the is UpdateAvailable extension.

The length field indicates the length, in bytes, of the data field.

The data field includes the particular data associated with the is UpdateAvailable extension. The data field may be a simple flag, where a value of "1" indicates that an update is available and a value of "0" indicates that no updates are available (or vice-versa). Alternately, the data may include the flag, as well as information about what type of update is available (i.e., a software update or a firmware update), and an IP address from where the update may be downloaded.

At block 416, mobile device 102 receives the registration-reply and parses the is UpdateAvailable extension. When the is UpdateAvailable extension indicates there is an update available, mobile device 102 may obtain the update. If the extension does not include an IP address indicating from where the update may be downloaded, mobile device 102 may obtain the update from the IP address stored in device update data 310.

An embodiment of the present invention has been described above. Those skilled in the art will understand, however, that changes and modifications may be made to this embodiment without departing from the true scope and spirit of the present invention, which is defined by the claims.

We claim:

1. A method comprising:
   receiving, by a network access server (NAS) device, a Mobile-IP registration request seeking to establish a Mobile-IP session for a mobile device;
   in response to receiving the Mobile-IP registration request, transmitting, by the NAS device, an access-request to an authentication, authorization, and accounting (AAA) server device;
   receiving, by the NAS device, an access-reply from the AAA server device, the access-reply indicating that an update is available for the mobile device;
   transmitting, by the NAS device, the Mobile-IP registration request to a home agent device;
   receiving, by the NAS device, a Mobile-IP registration reply from the home agent device;
   appending, by the NAS device, a Mobile-IP extension to the Mobile-IP registration reply, the Mobile-IP extension indicating that the update is available for the mobile device; and
   transmitting, by the NAS device, the Mobile-IP registration reply with the appended Mobile-IP extension to the mobile device.

2. The method of claim 1, wherein the Mobile-IP registration request is a Mobile-IPv4 registration request.

3. The method of claim 1, wherein the Mobile-IP registration request is a Mobile-IPv6 binding update.

4. The method of claim 1, further comprising: providing the update to the mobile device.

5. The method of claim 1, wherein the update is a software update.

6. The method of claim 1, wherein the update is a firmware update.

7. A network access server (NAS) device comprising:
   a hardware processor;
   data storage device; and
   program logic stored in the data storage and executable by the processor to:
   receive a Mobile-IP registration request seeking to establish a Mobile-IP session for a mobile device;
   in response to receiving the Mobile-IP registration request, transmit an access-request to an authentication, authorization, and accounting (AAA) server device;
   receive an access-reply from the AAA server device, the access-reply indicating that an update is available for the mobile device;

transmit the Mobile-IP registration request to a home agent device;
receive a Mobile-IP registration reply from the home agent device;
append a Mobile-IP extension to the Mobile-IP registration reply, the Mobile-IP extension indicating that the update is available for the mobile device; and
transmit the Mobile-IP registration reply with the appended Mobile-IP extension to the mobile device.

8. The NAS device of claim 7, wherein the Mobile-IP registration request is a Mobile-IPv4 registration request.

9. The NAS device of claim 7, wherein the Mobile-IP registration request is a Mobile-IPv6 binding update.

10. The NAS device of claim 7, wherein the update is provided to the mobile device.

11. The NAS device of claim 7, wherein the update is a software update.

12. The NAS device of claim 7, wherein the update is a firmware update.

13. A system comprising:
a network access server (NAS) device comprising a hardware processor and data storage device;
an authentication, authorization, and accounting (AAA) server device; and
a home agent device,
wherein the NAS device is configured to receive, from a mobile device, a Mobile-IP registration request seeking to establish a Mobile-IP session for the mobile device, and transmit an access-request to the AAA server device,
wherein the AAA server device is configured to receive, from the NAS device, the access-request, determine that an update is available for the mobile device, and transmit, to the NAS device, an access-reply indicating that the update is available for the mobile device,
wherein the NAS device is further configured to receive the access-reply from the AAA server device, and transmit the Mobile-IP registration request to the home agent device,
wherein the home agent device is configured to receive the Mobile-IP registration request from the NAS device, and transmit a Mobile-IP registration reply to the NAS device, and
wherein the NAS device is further configured to receive the Mobile-IP registration reply from the home agent device, append a Mobile-IP extension to the Mobile-IP registration reply, the Mobile-IP extension indicating that the update is available for the mobile device, and transmit the Mobile-IP registration reply with the appended Mobile-IP extension to the mobile device.

14. The system of claim 13, wherein the Mobile-IP registration request is a Mobile-IPv4 registration request.

15. The system of claim 13, wherein the Mobile-IP registration request is a Mobile-IPv6 binding update.

16. The system of claim 13, wherein the update is provided to the mobile device.

17. The system of claim 13, wherein the update is a software update.

18. The system of claim 13, wherein the update is a firmware update.

* * * * *